Feb. 22, 1944.  A. R. OLPIN  2,342,553
METHOD FOR DETERMINING MOISTURE IN MATERIALS
Filed Dec. 20, 1940
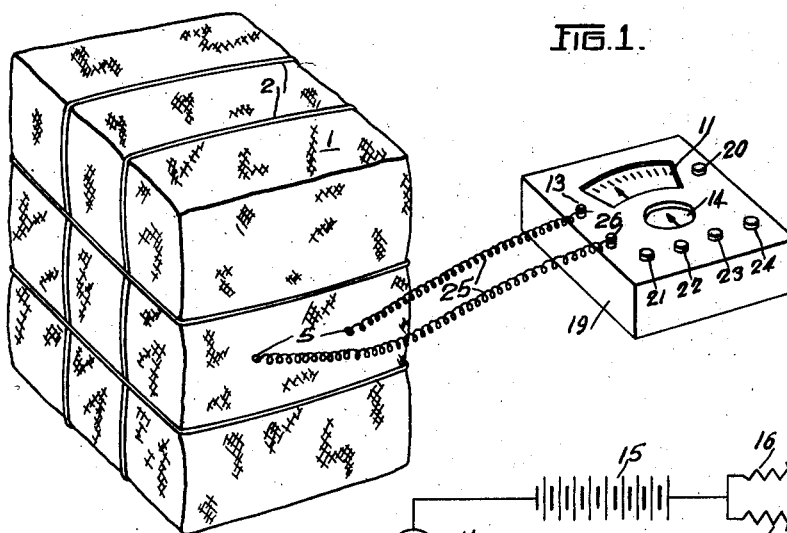
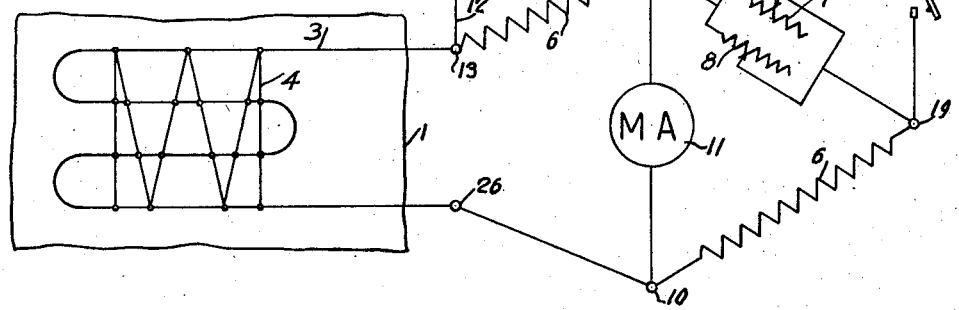
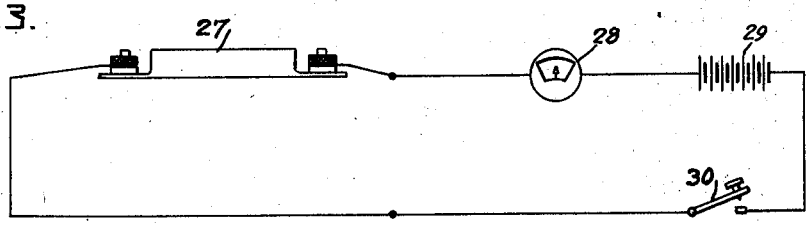
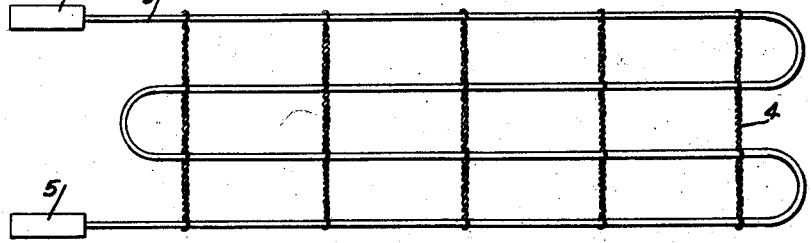
Inventor
ALBERT R. OLPIN,
BY Taulmin & Taulmin
Attorneys Patented Feb. 22, 1944

2,342,553

UNITED STATES PATENT OFFICE 2,342,553

METHOD FOR DETERMINING MOISTURE IN MATERIALS

Albert R. Olpin, Columbus, Ohio, assignor to The Ohio State University Research Foundation, Columbus, Ohio, a corporation of Ohio Application December 20, 1940, Serial No. 370,948

2 Claims. (Cl. 73—51)

The present invention relates to methods for indicating and measuring moisture in bulk staple goods which are merchandised in baled package or parcel form.

In the purchase of baled cotton, wool or hay not only is the weight of the bale and the quality of the contents taken into consideration, but also the moisture content. It is therefore necessary to know the amount of moisture in such a bale in order to accurately compare the weights of the bales or bundles on a standard basis. Apparatus for determining the moisture in soil is well known, but this apparatus operates on the basis of making the determination from a sample of the soil, employing the assumption that the soil adjacent the sample has at least approximately the same water content as the sample. This is usually a fair assumption to make. However, such a procedure would not be suited to staple goods which have already been baled or packaged, because of the difficulty of procuring a sample from the bale and on account of the fact that the presence of moisture at one part of the bale would not necessarily be a criterion of the moisture in another part. It would also be difficult to obtain a sample from the heart of the bale, which is often inaccessible. It will be understood that bales of cotton are of considerable size and usually tightly bound by baling straps, which makes it very difficult to obtain a sample often from positions within the bale not far from the outer surface.

The primary object of the invention is to provide a method of determining moisture conditions throughout a material in compact or bundle form.

A more specific object is to provide improved moisture-determining methods for use in connection with bales of staple goods such as cotton, wool, hay, etc., without necessitating the extraction of a sample from the bale for the determination experiments.

Still another object is to provide an improved moisture-determining method which gives an average measurement of the moisture in the heart of a bale, as well as at all other interior parts.

These objects are attained, in brief, by inserting within the bale, preferably as a permanent fixture, a resistor which forms part of a balanced bridge circuit, and measuring the amount of unbalance brought about by moisture immediately adjacent the resistor by an electrical instrument which may be calibrated in terms of moisture content. As a modification, I may reestablish the balanced conditions at the bridge circuit after the bridge had been unbalanced by the moisture conditions within the bale, and calibrate the balancing devices in terms of moisture content.

The invention will be better understood when the specification is perused in connection with the accompanying drawing.

In the drawing:

Figure 1 is a perspective view of the improved moisture-determining apparatus.

Figure 2 is a view in diagram of the wiring system employed in connection with Figure 1.

Figure 3 shows a modified form of system for determining moisture.

Figure 4 is an enlarged view of the resistor employed in the systems of Figures 1 and 2.

Referring more particularly to Figures 1 and 2, reference numeral 1 designates a bale or bundle of staple goods such as cotton, wool, hay, etc., which has been tightly bound into rectangular form by the baling straps 2. When a bundle of this character is being sold as merchandise, or is to be placed in storage, it is necessary to know the average moisture content throughout the bale. It has been the practice heretofore to extract from the bale a small sample of the material and to subject that sample to moisture-determining apparatus. The procedure was to compare, from the standpoint of moisture content, the sample which had been extracted from the bale with a similar quantity of the same material from which all of the moisture had been driven off. This comparison involved the use of electrical circuits and instruments. It is apparent that such a procedure belongs in a laboratory, and cannot be readily used in practice in the case where a large number of bales must be individually tested for moisture and the testing must be done immediately before purchase, or before the goods was placed in storage. Moreover, the taking of the sample from the bale might give the latter at least a slightly damaged appearance, and would certainly reduce the contents of each bale which in the case of a large sample might be substantial. However, in accordance with my invention a test for moisture conditions may be made on the bale in situ, and can be quickly accomplished with ordinary kinds of instruments which will give a direct and accurate reading of the moisture content of the bale throughout any desired portion of the bale and at any particular position within the bale.

Referring to Figure 2, there is inserted within the bale 1 during the baling operation a relatively long resistance wire 3, which as shown may take the form of a U-shaped zigzag, and in which the legs of the wire are strengthened and held in position during the baling operation by relatively stiff rods 4 which span the wires and are constituted of an insulating material. I may also employ a skein of lacquered wire for this purpose. For the wire 3, I prefer to use an element having considerable resistance, such as uranium oxide or uranium sulphide, the resistance of which increases rapidly with the temperature. However, it will be understood that ordinary metals may be employed, such as copper, provided the length of the metal wire within the bale is sufficiently great to give sufficient resistance and therefore to provide large changes in resistance for ordinary changes in temperature. The wire 3 is preferably positioned within the bale at those places where it is desired to obtain a moisture determination, and as illustrated the wire extends from positions not far removed from the sides of the bale to positions within the heart or center of the bale. The length of the wire 3 and its specific configuration will depend largely on the shape of the bale and the requirements as to where the moisture content determinations shall be made.

The wire can be readily formed into a latticework, serially connected together as indicated in Figure 4, or wound on drums or hollow rods inserted within the bale. The supporting elements 4 (Figure 4) may be formed of twisted strands of a relatively rigid insulating material, and secured to the resistance wire either by interweaving the strands about the wire or in any other suitable manner. The outer ends of the wire 3 preferably terminate in a pair of terminals 5 which extend externally of the bale, so that electrical contact can be readily made thereto.

The measuring or determining circuit is illustrated to the right in Figure 2 and consists essentially of a bridge circuit formed of two resistance legs 6, preferably of a material such as manganin, which has a relatively high specific resistivity. The third leg of the bridge is constituted of two variable resistors 7, 8 connected in paralel, one of these resistors being so arranged and constructed as to give a considerable change in resistance when its adjustable tap is moved, and the other provides a fine adjustment resistance. Across the balance points 9, 10 of the bridge there is an electrical measuring device 11, preferably a microammeter. For energizing the bridge a conductor 12 is taken from the point 13 and through an ammeter 14, a battery 15 (preferably six volts) and through a pair of resistors 16, 17 connected in parallel and a switch 18 to the opposite side of the bridge 19. As in the case of the resistors 7, 8, the resistors 16 and 17 consist of any suitable and well known resistance material, one of the resistors giving a fine adjustment and the other one a coarse adjustment.

The operation of the moisture-determining circuit is practically self-evident from the showing in Figure 2. Assume that the bridge circuit has been carefully balanced by manipulating the resistors 7 and 8 and employing the resistor 3 in a bale of cotton which is practically entirely free of moisture, it is apparent that if the resistor 3 were now inserted in a bale of cotton having a moisture content, the heat radiated from the wire 3, which derives its energy from the battery 15, is readily conducted through the surrounding wet material so that the resistor 3 runs at a cooler temperature for a given current passing through the ammeter 14 than was the case when the resistor 3 was surrounded by completely dry material. Consequently, the resistance of the wire 3 is appreciably lowered, assuming that the same current passes through the ammeter 14 when the resistor 3 is surrounded by relatively wet material as when surrounded by relatively dry material.

Under these circumstances the balance of the bridge will be upset and in order to restore the balance the resistors 7, 8 (preferably only the finely adjustable resistor) will be moved until the potential between the points 9, 10 become zero, as indicated by the instrument 11. It is apparent that the amount of adjustment required at the resistor 7 or 8 to reestablish equilibrium or balanced conditions becomes a direct function of the moisture conditions of the material immediately surrounding the wire 3. The bridge circuit, in effect, measures the change in the resistance of the wire 3, and inasmuch as this change in resistance is a function of the change in temperature of the resistor, which in turn is a function of the rate at which heat is radiated by the resistor, it is apparent that the adjustment necessary to re-balance the bridge becomes a function of the moisture conditions immediately surrounding the wire 3.

It is desirable, in making the moisture determinations, to pass no more than a predetermined amount of current through the wire 3 and to apply potential to the wire only for a limited length of time. It is apparent that unless the current through the wire 3 is limited both in magnitude and time of duration, the heat of the wire will tend to expel the moisture from the wire so that incorrect determinations of the moisture content will be made. By adjusting the resistors 16, 17 the current passing through the meter 14 into the resistance wire 3 may be accurately controlled, and the switch 18 is provided to pass a momentary impulse from the battery into the resistance wire 3.

My invention contemplates the permanent insertion of the wire 3 in the bale or bundle, and placed in position during the baling or bundling operation. Consequently, when it is desired to determine the moisture content of all of the parts of the bale immediately surrounding the wire 3, it is necessary only to connect the remaining portions of the bridge circuit to the terminals 5 of the wire. The bridge circuit can be conveniently housed in a box 19 which includes the ammeters 11, 14, also the resistors 7, 8, 16, 17, the battery 15, the switch 18 and the resistor 6. In other words, the entire bridge circuit except the wire 3 may be self-contained in the box for portable reasons. The switch 18 may be conveniently in the form of a push-button 20, and the adjustment of the resistors 7, 8 and 16, 17 may be effected through the knobs 21, 22, 23 and 24, respectively. Connection may be made by the wires 25 between the terminals 13 and 26 of the bridge circuit to the terminals 5 of the resistor 3. By placing the entire bridge circuit, including the meters and the battery, in a box, the calibration of the system at the manufacturer's laboratory is facilitated and rigidly maintained under proper calibration since the only parts of the circuit which project to the outside of the box are the terminals 13, 26, also the resistor knobs 21, 22, 23 and 24. However, the manufacturer would place an indicating mark on these knobs to indicate the balanced calibrated conditions.

It is further evident that inasmuch as the adjustment of the resistor 7 or 8 reestablishes the balanced conditions, as indicated at the meter 11, and to compensate for the moisture immediately surrounding the resistor 3, the movements of the resistors 7, 8 can be marked on the face of the instrument in terms of moisture percentages. However, if desired, the resistors 7, 8 may have a fixed value set by the manufacturer during the calibration tests, thus eliminating the necessity for the knobs 21 and 22, in which case the degree of unbalance in the bridge circuit brought about by the moisture conditions within the bale would be indicated on the ammeter 11, which if desired, could also be calibrated in terms of moisture content. The manufacturer's calibration of the instrument may include the insertion of a resistor 3 into a bale of the same material for which the instrument is to be used, but in which the material has been completely denuded of moisture. For this purpose the cotton or wool, before being baled, would be heated in an oven for a sufficient length of time to remove all moisture. The constants of the bridge would then be set for a balanced or equilibrium condition. Measured quantities of water in different amounts would then be equally distributed throughout the bale in any suitable and well known manner, if necessary unbaling the bundle for this purpose. The amount of unbalance indicated at the resistors 7, 8 or at the ammeter 11, assuming that the same current was flowing through the ammeter 14, could then be translated into moisture content denominations, and if desired indications to this effect could be marked on the knobs or dial corresponding to the adjustable resistors 7, 8 and the ammeter 11.

Figure 3 shows a modified form of the moisture-content-determining circuit in that a thermistor 27 is employed and connections made between the thermistor and a current measuring device 28, a low voltage battery 29 and a press button switch 30. A thermistor of suitable character has been described in the "Bell Laboratories Record" for July, 1940, vol. XVIII, No. 11 at page 325. The material of the thermistor may be constituted of silicon carbide, but I prefer to use uranium oxide or uranium sulphide. A thermistor is characterized by a rapid increase in resistance with temperature. Assuming that the thermistor 27 has been embedded in a bale of cotton leaving only its terminals exposed, a current of predetermined amount, as indicated at the ammeter 28, is passed through the thermistor by actuating the switch 30. A change in the indicated current due to a reduction in the resistance at the thermistor would indicate that there was moisture present immediately adjacent the thermistor, and the amount of change at the ammeter would in general represent the percentage of the moisture content.

It will be understood that at the moment of initial contact at the switch 30 the resistance of the thermistor would be practically the same under all conditions regardless of the moisture present in the bale. However, after the current has flowed for a short time, the thermistor will begin to heat and the conduction of heat into the surrounding cotton will be a direct measure of the moisture conditions at the position of the thermistor, reflecting itself in changes of resistance and therefore in a change of current indicated at the meter 28. As in the case of the Wheatstone bridge arrangement shown in Figure 2, the meter 28 could be calibrated to indicate moisture content directly. It is also intended that the thermistor 27 be permanently embedded in each bale of cotton, wool or hay, the moisture content of which is to be determined, so that the only apparatus in the case of the system shown in Figure 3 that is necessary would be the meter 28, the battery 29 and the switch 30. These elements could be readily placed in a convenient box. It will be understood that the system shown in Figure 3 may not give the same degree of accuracy as the highly sensitive bridge circuit together with its adjustable resistors, both in the legs of the bridge and in the battery energizing circuit, although for ordinary purposes when a rough estimate of the moisture content is sufficient, the circuit shown in Figure 3 will be found satisfactory.

From the foregoing it is evident that I have disclosed an apparatus and method for readily determining the moisture content of staple goods bound into bale, parcel or package form without the necessity of removing from the bale a sample of the material which would normally be sent to a scientific laboratory. The apparatus contemplated is of an inexpensive character, can be self-contained and accurately calibrated with permanent or readily reproducible adjustments by the laboratory to give an extremely accurate determination of the moisture content of the bale. An advantage of permanently embedding the resistance element in the bale lies in the fact that the element can be placed in the heart of the bale, or in any other part, and the moisture determined without destruction of the bale or package, or any part thereof, or without opening to enable moisture changes to occur within the bale. The resistance wire or coil can be made to spread over a greater or less area and therefore readings of moisture can be made for large areas or small concentrated spots. The wire or coil may be woven or twisted into any desirable shape or shapes. In the event that the moisture content of an electric conducting material is to be determined, the resistance element 3 or 27 may be inclosed in glass or other nonconducting media, so as electrically to insulate the resistance wire from the conducting material in which it is inserted.

While I have described my invention with more particular reference to the determination of moisture in bales of cotton, wool or hay, it will be understood that the use of the resistance element 3, 27 is not confined to these materials but may be employed in connection with any solid or semi-solid insulating or electric conducting material (when the resistance wires are suitably insulated) and bound either in baled package or parcel form, or in any other manner compacted into a unit from which it is undesirable to extract a sample for moisture-content-determination. The cost of the resistance element 3 and its supports is only nominal, and the bale containing the resistance element would weigh only slightly more than a bale without the element. In addition to providing an initial determination of the moisture content throughout the bale, the permanently positioned resistance element could be used time and again to determine whether the moisture conditions within the bale have changed over a period of time. This may be of decided advantage in case the bale contained more than a permissible amount of moisture originally and it was decided to treat the bale for moisture before storing the same. The apparatus disclosed herein is not claimed in this application but is made the subject matter of claims of my divisional application Serial No. 384,912, filed March 24, 1941.

It will be understood that I desire to comprehend within my invention such modifications as come within the scope of the claims and the invention.

Having thus fully described my invention, what I claim as new and desire to secure by Letters Patent, is:

1. In the art of determining the moisture content of a bale, package, mass or the like of fibrous material comprising placing in position in the material during the baling, packaging or massing operation an elongated resistance unit which passes back and forth within the interior the body of fibrous material so as to contact representative parts of the bale, package, or mass and with terminals exposed outside the fibrous material, permitting the elongated resistance unit to obtain temperature equilibrium with the fibrous material comprising the bale, package, or mass, applying an electric potential to the terminals for passing current through said elongated resistance and so choosing the size of the current and the time interval in which said current is applied that the amount of moisture movement away from said resistance is negligible, and measuring the amount of said current as an index of the moisture content of the fibrous material of the bale, package, or mass.

2. In the art of determining the moisture content of a bale, package, mass or the like of fibrous material comprising placing in position in the material during the baling, packaging or massing operation an elongated resistance unit which passes back and forth within a single plane within the interior of the body of fibrous material so as to contact representative parts of the bale, package, or mass and with terminals exposed outside the bale, package, or mass, permitting the elongated resistance unit to obtain temperature equilibrium with the fibrous material comprising the bale, package, or mass, applying an electric potential to the terminals for passing current through said elongated resistance and so choosing the size of the current and the time interval in which said current is applied that the amount of moisture movement away from said resistance is negligible, and measuring the amount of said current as an index of the moisture content of the fibrous material of the bale, package, or mass.

ALBERT R. OLPIN.